Jan. 4, 1966
M. D. LISTON
3,227,873
INFRARED DETECTOR AND METHOD UTILIZING A
GAS OF SMALL MOLECULAR SIZE TO BE
DIFFUSED INTO THE DETECTOR
Filed Oct. 30, 1962
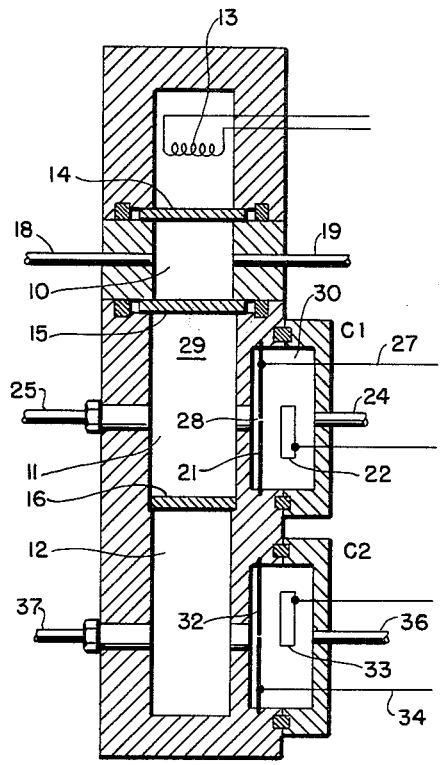
INVENTOR.
MAX D. LISTON
BY
Samuel B. Stone
ATTORNEY

United States Patent Office 3,227,873
Patented Jan. 4, 1966

3,227,873
INFRARED DETECTOR AND METHOD UTILIZING A GAS OF SMALL MOLECULAR SIZE TO BE DIFFUSED INTO THE DETECTOR
Max D. Liston, La Habra, Calif., assignor to Beckman Instruments, Inc., a corporation of California
Filed Oct. 30, 1962, Ser. No. 234,164
8 Claims. (Cl. 250—43.5)

The present invention relates to infrared detectors and more particularly to infrared detectors in which a light gas is preferentially absorbed into the interior walls thereof.

Infrared analyzers and detectors therefor are well known in the art. In such analyzers, an infrared radiant energy source is arranged such that the radiation therefrom passes through a sample cell containing an unknown substance to be analyzed, and through one or more infrared detector cells. A positive-type analyzer of this nature is disclosed in U.S. Patent No. 2,924,713 entitled Instruments by Max D. Liston, in which a sample cell and two detector cells are employed. The three cells are arranged in optical series relation. The unknown substance in the sample cell absorbs energy in the infrared spectrum. Each of the detector cells has a different charge of gas therein, and includes a variable capacitor having plates movable relative to each other by changes in energy of the gas within the respective cell. The energy change within the respective cell is a function of the change in radiant energy reaching the cell.

An important factor which has influenced the accuracy of positive-type pneumatic analyzers is the changes in the responsivity of the detectors employed therein. Infrared detectors of this type are extremely sensitive to the number of gas molecules in the absorption chamber. Changes as little as one tenth of one percent may produce very significant errors, particularly when employed in a single beam type arrangement having the sample cell and detector cells in optical series. It is believed that the main reason for the changes in charges in the detector cells is the absorption of the charging gas in the pores of the metal in the detector and also on the walls of the detector. This absorption gives rise to two types of difficulty in the over-all instrument; first, the instrument experiences long-term drifts which are a function of time and storage temperature; and second, the detectors display rather high temperature coefficients. The temperature coefficients referred to are particularly troublesome since they may require hours and even days to equilibriate after the detectors are shifted to a new temperature.

A number of approaches have been unsuccessfully attempted in trying to minimize the absorption problem discussed above. Some improvements have been realized by utilizing a very dense non-porous plating in an effort to fill the pores of the containing vessel. An example of such a plating is an electrolysis nickel on aluminum, with a flash of gold on top of the nickel. Additionally, British patent specification No. 727,600 describes the use of a metal bellows which may be adjusted to vary the total volume of the detector in order to compensate for losses of the charging gas into the walls of the detector. Although this latter scheme enables manual adjustment to restore the detector to its original condition, it does not prevent the changes and their accompanying drifts and errors.

According to a feature of the present invention, a gas which is preferentially absorbed in the interior walls of an infrared detector is employed in the detector.

An additional feature of the present invention is the use of a light gas in the charging blend employed in an infrared detector chamber.

A further feature of the present invention is the provision of a charge for infrared detectors including a percentage of a gas having a small molecular size.

A still further feature of the present invention is the utilization, in the charging blend for an infrared detector, of a percentage of helium.

Another feature of this invention is the use of a percentage of hydrogen in the charging blend for an infrared detector.

A further feature of this invention is the provision of a method for selectively filling the pores of an infrared detector.

According to the present invention a percentage of a gas of small molecular size is included in the charging blend in an infrared detector, or applied within the detector prior to the application of the charging blend. The specific amount of the gas needed is believed to be a function of the porosity of the cells in the containing vessel. By utilizing a gas of small molecular size, this gas selectively diffuses into and fills the pores of the chamber, rather than the infrared absorbing gas. Additionally, the infrared absorbing gas is not lost or passed into and out of the pores of the detector, and the stability of the detector is substantially increased.

It has been found that the time required for an infrared detector to "age-in" and stabilize is greatly reduced when a percentage of a gas of small molecular size is used in the detector. Additionally, the temperature coefficients of the detectors are reduced, thereby reducing the drift during warm-up and diminishing the accuracy required in maintaining the infrared detectors at a constant temperature. Not only are the detectors more stable initially, but also, the calibration does not change with time, and the calibration does not change significantly with temperature. Since an increase in temperature results in an increase in kinetic energy and a resultant reduction in the packing of molecules, some of the gas in the detector is driven from the pores of the detector walls as heat is increased. The opposite occurs as the heat is reduced. This action results in the gas being driven in and out of the pores of the detector. Certain gases of small molecular size, such as, helium, do not affect the detector performance as much in moving into and out of the pores as does the infrared absorbing gas. Thus, by the use of a gas of small molecular size in the detector, which gas tends to diffuse into the pores of the detector, temperature effects are far less pronounced.

Other features and objects of the invention will be better understood from a consideration of the following detailed description when read in conjunction with the attached drawing, the single figure of which illustrates a sample cell and two detector cells of an infrared analyzer.

Referring now to the drawing, a cross-sectional view of a sample cell 10 and two detector cells 11 and 12 is illustrated. A radiant energy source 13, which may be a conventional coil of resistance wire energized from an oscillator (not shown), is arranged to pass infrared energy through the sample cell 10 and the two detector cells 11 and 12. The cells 10 through 12 may be constructed of a suitable material, such as, aluminum.

The three cells are arranged in optical series relation and are separated by windows 14, 15 and 16 of quartz or other material having suitable transmission characteristics. The sample cell 10 has an inlet 18 and an outlet 19 providing continuous flow of sample therethrough for continuous monitoring of process streams, or the like. Of course, the cell also may be used for batch measurements if desired.

Means are provided in each detector cell 11 and 12 for determining energy changes occurring therein. Typically, the mechanical movement of a vane or plate may be converted to an electrical signal. In the exemplary embodiment shown herein, a flexible diaphragm 21 is mounted in the detector cell 11 and constitutes one plate of a capacitor C1. Another plate 22 of the capacitor C1 is fixed in place in the detector cell 11. An outlet 24 provides for evacuation of the detector cell 11 and an inlet 25 provides for introduction of the new charge of gas. The outlet 24 and the inlet 25 may be sealed after a charge of gas is entered into the cell 11. The diaphragm 21 responds to a volume change in the cell 11 produced by absorption of infrared energy by the gas in the cell. The plate 22 of the capacitor C1 may be biased by a voltage source (not shown), and capacitance variations caused by diaphragm motion are converted to a voltage output on a line 27. The response of the diaphragm 21 is to dynamic volume change, and a small hole 28 in the diaphragm 21 maintains static pressure equilibrium between a main chamber 29 of the detector cell 11 and an associated chamber 30 of the cell.

The detector cell 12 is substantially identical to the cell 11 and has a capacitor C2 with plates 32 and 33. Also, an outlet 36 and an inlet 37 are provided. The plate 33 also is biased by a voltage source (not shown), and capacitance variations caused by motion of the diaphragm 32 are converted to a voltage output on a line 34. The output lines 27 and 34 may be coupled together and connected through an amplifier and a detector to a recorder as explained in greater detail in co-pending U.S. patent application of Max D. Liston, et al., entitled Infrared Analyzer, Serial No. 13,932, filed March 9, 1960, now Patent No. 3,130,302, and assigned to the same assignee as the present application. The particular electronic detecting circuitry connected with the capacitors C1 and C2 forms no part of the present invention and, thus, is not set forth in any greater detail in the present application.

In a typical operation of an infrared analyzer in the past, the detector cells 11 and 12 may be charged with a mixture of CO, the gas to be analyzed for, and argon which is used as a diluent to build up the total pressure in the cell. With the sample cell 10 empty or with an inert gas passing therethrough, the source 13 is pulsed at a low rate and the electronic circuit of the analyzer is adjusted for zero. Subsequently, the sample to be analyzed is passed through the sample cell 10 and when CO gas is present in the sample, infrared energy is absorbed in the sample cell 10 rather than in the first detector cell 11. This change in the amount of infrared energy absorbed in the detector cell results in a relative change in the time-varying changes of the capacitors C1 and C2 and, hence, outputs are produced on the output lines 27 and 34. These output signals may be summed, amplified, and detected to provide an output signal indicative of the quantity of CO in the sample passing through the sample cell 10.

As was noted previously, detectors 11 and 12 are extremely sensitive to the number of gas molecules in their respective absorption chambers. It is believed that changes in the charges of gas within the chambers is a result of the absorption in the pores of the metal in the detector and also on the walls of the detector. Because of this fact, it has been necessary to age the detectors after they are initially charged. Frequently it has been necessary to age detectors for two months or more before the drift rate settles to a low percentage within a given period of time. Additionally, the detectors experience long-term drifts which are a function of time and storage temperature, and display rather high temperature coefficients. The temperature coefficients are particularly troublesome since hours and even days may be required for the detector to equilibrate after being shifted to a new temperature. Because of temperature variations, molecules of the charging gas are driven in and out of the pores of the detector, and since the number of molecules within the chamber varies with temperature, so does the accuracy of the detectors.

According to a feature of the present invention, the charging blend used in the detector cells 11 and 12 includes an amount of a gas of small molecular size. This gas is preferentially absorbed in the pores of the metal of the detector and on the walls of the detector rather than the infrared absorbing gas. Examples of gases of small molecular size which have been found suitable are hydrogen and helium; however, helium has been found to be preferable. Without the inclusion of a gas of small molecular size in the charge, approximately two months is required for a detector to "age-in" and stabilize. With a small percentage of hydrogen, the same amount of time may be required, but the drift over the two-month period is diminished by a factor of four to five times. However, with helium, the required aging time is reduced from approximately two months to around one to three weeks. Additionally, during this period of time, the detector changes are small enough to be tolerable after the first three to four days. Temperature coefficients of the detectors also are reduced by employing helium in the charging blend.

An example of typical charges for the detectors 11 and 12 when detecting for CO is 230 mm. total charge in each detector, with detector 11 being charged with 20% CO, 10% helium and 70% argon, and with detector 12 being charged with 90% CO and 10% helium. An example of typical charges for the detectors 11 and 12 when detecting Freon 12 is 230 mm. total charge in each detector, with detector 11 being charged with 1.4% Freon 12, 88.6% argon and 10% helium, and with detector 12 being charged with 1% Freon 114, 89% argon and 10% helium. An example of typical charges for the detectors when detecting for $CO_2$ is 230 mm. total charge in each detector, with detector 11 being charged with 10% $CO_2$, 10% helium and 80% argon, and with detector 12 being charged with 90% $CO_2$ and 10% helium. The above charges are exemplary and different proportions of the respective gases may be employed.

The following table indicates the improvement in drift rate in detectors with helium in the charge versus detectors without helium. Detectors A through D were CO detectors without helium, and detectors E through I were CO detectors with helium in the charging blend. The number of days given in the right-hand column is the number of days required for these detectors to settle to a drift rate of less than 1% in twenty-four hours.

*Without helium*

| Detector No.: | No. of days |
|---|---|
| A | 49 |
| B | 128 |
| C | 56 |
| D | 80 |

*With Helium*

| Detector No.: | No. of Days |
|---|---|
| E | 18 |
| F | 26 |
| G | 13 |
| H | 17 |
| I | 8 |

Instead of actually adding a small percentage of a light gas to the charge for the detectors, a substantially one-hundred percent charge of the light gas may be employed prior to using a conventional charge. This may be accomplished, for example, by charging with 100% helium to one or a few atmospheres. This charge may be left in for a period of time, such as, twenty-four hours or longer, and subsequently withdrawn. Thus, the detector may be charged with the light gas and allowed to "soak" for a period, followed by pumping out the light gas and recharging with a conventional charge. Additionally, it may be desirable to elevate the temperature of the detector during "soaking" to a temperature, such as 180° F., in order to accelerate the absorption of the light gas into the walls of the detector cell. It should be noted that it would be desirable to withdraw the light gas quickly and quickly recharge with the conventional charge in order to prevent an escape of the light gas which has been absorbed in the pores and on the walls of the detector.

It now should be apparent that the present invention relates to the use of a percentage of a gas of small molecular size in an infrared detector. The gas of small molecular size selectively diffuses into and fills the pores of the detector chamber, rather than the infrared absorbing gas being absorbed therein. Additionally, the infrared absorbing gas is not lost or not passed into and out of the pores of the detector, and the stability of the detector is substantially increased.

Although particular gases have been discussed in connection with specific charges and charging blends to be utilized in an infrared detector, other suitable gases may be utilized. Furthermore, it will be understood that although examples of gases of small molecular size which have been found suitable in practicing the concepts of the present invention have been disclosed and discussed, other suitable gases which will fill pores in detector cells may be utilized; and that other applications are possible, and that the invention as disclosed may be subjected to various changes, modifications and substitutions without necessarily departing from the spirit of the invention.

What is claimed is:

1. A method of improving the operation of an infrared detector by substantially filling the pores of said detector comprising the steps of
    mixing a charging blend containing at least a portion of a gas to be detected, and containing approximately 10%, relative to the total blend, of a gas of small molecular size,
    filling said detector to a predetermined pressure with said charging blend of gas, and
    sealing said detector.

2. A method as in claim 1 wherein said gas of small molecular size is helium.

3. A method as in claim 1 wherein said gas of small molecular size is hydrogen.

4. A method of improving the operation of an infrared detector by substantially filling the pores of said detector comprising the steps of
    charging said detector with at least a substantial percentage of a gas of small molecular size,
    withdrawing said charge, and
    filling said detector to a predetermined pressure with a charging blend of gas.

5. A method of improving the operation of an infrared detector by substantially filling the pores of said detector comprising the steps of
    charging said detector with at least a substantial percentage of a gas of small molecular size,
    elevating the temperature of said detector for a predetermined period of time,
    withdrawing said charge, and
    filling said detector to a predetermined pressure with a charging blend of gas.

6. An infrared analyzer comprising a radiant energy source, a sample cell and at least a first detector cell mounted in optical series for radiation from said source, said detector cell including a chamber for containing a gas, said chamber being made of a material having pores therein
    a blend of gas in said chamber; said blend including at least a portion of the gas to be detected, and including approximately 10%, relative to the total blend, of a gas of small molecular size, said latter gas being selectively diffused into the pores of said chamber.

7. An infrared detector as in claim 6 wherein said gas of small molecular size is hydrogen.

8. An infrared detector as in claim 6 wherein said gas of small molecular size is helium.

References Cited by the Examiner

UNITED STATES PATENTS

| 2,674,696 | 4/1954 | Smith | 250—43.5 |
| 2,721,942 | 10/1955 | Friel | 250—43.5 |
| 2,875,340 | 2/1959 | Liston | 250—43.5 |
| 2,924,713 | 2/1960 | Liston | 250—43.5 |

RALPH G. NILSON, *Primary Examiner.*